(12) United States Patent
Smith et al.

(10) Patent No.: US 12,343,928 B2
(45) Date of Patent: Jul. 1, 2025

(54) BUILD ORIENTATION FOR ADDITIVE MANUFACTURING OF COMPLEX STRUCTURES

(71) Applicant: Optisys, Inc., West Jordan, UT (US)

(72) Inventors: Robert Smith, West Jordan, UT (US); Michael C. Hollenbeck, West Jordan, UT (US)

(73) Assignee: Optisys, Inc., Salt Lake City, UT (US)

( * ) Notice: Subject to any disclaimer, the term of this patent is extended or adjusted under 35 U.S.C. 154(b) by 561 days.

(21) Appl. No.: 16/248,285

(22) Filed: Jan. 15, 2019

(65) Prior Publication Data
US 2019/0248064 A1 Aug. 15, 2019

Related U.S. Application Data

(60) Provisional application No. 62/617,462, filed on Jan. 15, 2018.

(51) Int. Cl.
| | |
|---|---|
| *B29C 64/10* | (2017.01) |
| *B29C 64/386* | (2017.01) |
| *H01P 11/00* | (2006.01) |
| *H01Q 19/19* | (2006.01) |
| *B33Y 10/00* | (2015.01) |

(52) U.S. Cl.
CPC ............ *B29C 64/10* (2017.08); *B29C 64/386* (2017.08); *H01P 11/002* (2013.01); *H01Q 19/19* (2013.01); *B33Y 10/00* (2014.12)

(58) Field of Classification Search
CPC .......... B29C 64/386–40; B29C 64/153; B29C 64/393; B33Y 50/00–02; B22F 10/80; B22F 10/85
See application file for complete search history.

(56) References Cited

U.S. PATENT DOCUMENTS

| | | | |
|---|---|---|---|
| 2,582,162 A | 2/1952 | Sensiper et al. | |
| 5,859,619 A | 1/1999 | Wu et al. | |
| 6,018,315 A | 1/2000 | Ince et al. | |
| 6,198,730 B1 | 3/2001 | Hogberg et al. | |
| 6,911,953 B2 | 6/2005 | Gothard et al. | |

(Continued)

FOREIGN PATENT DOCUMENTS

| | | |
|---|---|---|
| CN | 103961946 A | 4/2014 |
| DE | 4002522 A1 | 8/1991 |

(Continued)

OTHER PUBLICATIONS

Electronics Hub, Radiation of Electromagnetic Waves, https://www.electronicshub.org/radiation-of-electromagnetic-waves/, Sep. 12, 2015 (accessed May 29, 2021) (Year: 2015).*

(Continued)

*Primary Examiner* — Andrew L Swanson
(74) *Attorney, Agent, or Firm* — TechLaw Ventures, PLLC; Terrence J. Edwards

(57) ABSTRACT

Systems, methods, and devices of additive manufacturing (3D printing) of complex structures made of surfaces including at least some of which that are orthogonal to each other. Specifically disclosed herein are build orientations used to manufacture complex metal structures with a build chamber of an additive manufacturing printer. The novel build orientations allow the fabrication of components with a minimum of support structure.

19 Claims, 16 Drawing Sheets

(56) References Cited

U.S. PATENT DOCUMENTS

| | | | |
|---|---|---|---|
| 6,937,201 | B2 | 8/2005 | Gothard et al. |
| 7,187,340 | B2 | 3/2007 | Kralovec et al. |
| 9,253,925 | B1 | 2/2016 | Smith |
| 9,318,810 | B2 | 4/2016 | Zelenski |
| 9,960,495 | B1 | 5/2018 | Hollenbeck et al. |
| 10,170,833 | B1 | 1/2019 | Hollenbeck et al. |
| 10,468,773 | B2 | 11/2019 | Hollenbeck et al. |
| 10,481,253 | B1 | 11/2019 | Hollenbeck et al. |
| 10,680,341 | B1 | 6/2020 | Anderson et al. |
| 2007/0233298 | A1* | 10/2007 | Heide .................... B33Y 50/00 700/98 |
| 2013/0314172 | A1 | 11/2013 | Massman |
| 2015/0091769 | A1 | 4/2015 | Zelenski et al. |
| 2015/0097746 | A1 | 4/2015 | Wilson et al. |
| 2015/0197062 | A1* | 7/2015 | Shinar .................. B29C 64/112 700/98 |
| 2016/0067740 | A1 | 3/2016 | Voris et al. |
| 2016/0144574 | A1* | 5/2016 | Eilken .................... G06T 19/20 264/129 |
| 2017/0176979 | A1 | 6/2017 | Lalish et al. |
| 2017/0291372 | A1 | 10/2017 | Milshtein et al. |
| 2020/0127358 | A1 | 4/2020 | Rijk et al. |
| 2020/0161738 | A1 | 5/2020 | Rijk et al. |
| 2020/0266510 | A1 | 8/2020 | Gomez et al. |

FOREIGN PATENT DOCUMENTS

| | | |
|---|---|---|
| FR | 3087954 A1 | 5/2020 |
| WO | WO 2017203568 A1 | 6/2018 |

OTHER PUBLICATIONS

Maker's Muse, How to Orient 3D prints—3D Printing 101, YouTube, Jan. 15, 2017 (accessed Aug. 7, 2023), https://www.youtube.com/watch?v=JGhgaypou6E (Year: 2017).*

Form PCT/ISA/210—International Search Report for International Application No. PCT/US2019/0013699, mailed, Apr. 3, 2019.

Form PCT/ISA/237—Written Opinion for International Application No. PCT/US2019/0013699, mailed, Apr. 3, 2019.

Article 34 Amendment for International Application No. PCT/US2019/0013699, filed, Nov. 15, 2019.

F.I. Sheftman, "Experimental Study of Subreflector Support Structures in a Cassegrainian Antenna", Technical Report 416, Sep. 23, 1966, Lincoln Laboratory, Massachusetts Institute of Technology, Lexington, MA.

Machine translation prepared on Dec. 28, 2021, by Google Patents for Publication No. WO 2017203568.

Machine translation prepared on Dec. 28, 2021, by Google Patents for Publication No. FR3087954A1.

Motomi Abe, et al., "Ka-Band Branch Line Coupler Applied Hexagonal Waveguide Suitable for Additive Manufacturing," IEICE Trans. Electron., vol. E101-C, No.

Motomi Abe, et al., "A 3-D Metal-Direct-Printed, Low-Cost, and Light Hexagonal Waveguide Ka-Band Branch Line Coupler," Proceedings of the 47th European Microwave Conference, Oct. 2017, pp. 188-191, EuMA, Nuremberg Germany.

Zhang Kai, et al., "A Novel Design of Circularly Polarized Waveguide Antenna," 2014 3rd Asia-Pacific Conference on Antennas and Propagation, 2014, pp. 130-133, IEEE, Harbin, China.

James P. Becker, et al., "Toward a Novel Planar Circuit Compatible Silicon Micromachined Waveguide," Electrical Engineering and Computer Science, The University of Michigan, 1999, pp. 221-224, IEEE, Ann Arbor, Michigan.

N. Nathrath, et al. "Lightweight Intersatellitelink Antenna (LISA) operating at Ka-Band," Technical University of Munich, Institute of Astronautics, Munich, Germany, Published Apr. 12, 2010, Downloaded on Apr. 23, 2023 UTC from IEEE Xplore, 4 Pages.

* cited by examiner

BUILD ORIENTATION FOR ADDITIVE MANUFACTURING OF COMPLEX STRUCTURES

CROSS-REFERENCE TO RELATED APPLICATIONS

This US non-provisional patent application claims benefit and priority to U.S. provisional patent application No. 62/617,462 filed on Jan. 15, 2018, titled "BUILD ORIENTATION FOR ADDITIVE MANUFACTURING OF COMPLEX STRUCTURES", the contents of which are incorporated by reference as if fully set forth herein, and for all purposes.

This US non-provisional patent application is related to US continuation-in-part patent application No. 15/968,463, filed on May 1, 2018, pending, which in turn claims benefit and priority to U.S. continuation patent application Ser. No. 15/679,137, filed on Aug. 16, 2017, titled: INTEGRATED SINGLE-PIECE ANTENNA FEED AND CIRCULAR POLARIZER, issued as U.S. Pat. No. 9,960,495 on May 1, 2018, which in turn claims benefit and priority to U.S. non-provisional patent application Ser. No. 15/445,866, filed on Feb. 28, 2017, titled "INTEGRATED SINGLE-PIECE ANTENNA FEED", issued as U.S. Pat. No. 9,742,069 on Aug. 22, 2017, which in turn claims benefit and priority to U.S. provisional patent application No. 62/409,277 filed on Oct. 17, 2016, titled "INTEGRATED SINGLE-PIECE ANTENNA FEED", now expired. The contents of all of the above related patent applications and issued patents are incorporated by reference as if fully set forth herein and for all purposes.

BACKGROUND

Technical Field

Described herein are three-dimensional (3D) printing techniques, and more particularly, three-dimensional printing techniques for complex metal structures having any surfaces, internal or external, that are orthogonal or substantially orthogonal to each other.

Description of Related Art

Layered additive manufacturing works by joining multiple two-dimensional (2D) cross-sections along an axis that is perpendicular to the cross-sections. This joining may occur with discrete cross-sections or with a continuously changing cross-section. The direction of growth is typically perpendicular to the cross-sections and is typically called the z-axis with the x-y plane being parallel to the cross-sections being joined together. However, there are limitations to this process when surfaces overhang significantly (i.e., downward facing surfaces).

Support structure may be required for surfaces that face downward significantly for multiple reasons, for example and not by way of limitation: (1) absorbing heat from the material fusion source, (2) resisting uplift forces due to steep thermal gradients in the part, (3) preventing gravity from pulling the overhang downward, (4) providing continuity for fused material of a single layer until multiple layers can be established. Support structure serves very useful purposes.

However, there are also problems with the added support structure. Support structure is a challenge because it generally needs to be removed after fabrication and if the geometry is enclosed or the surface is inaccessible, this removal of the support structure becomes impossible. Surfaces that are constructed with supports attached to them and subsequently removed are often rougher than those without supports in the first instance. Surfaces with removed support structure are also subject to geometric uncertainty that comes with hand removal operations or other secondary processes.

Accordingly the need exists to be able to print complex geometries without support structure on surfaces that cannot be reached after fabrication is complete and/or the number of required support structures needs to be minimized.

BRIEF SUMMARY

Disclosed herein are various methods of 3D printing of complex metal structures made of surfaces that are significantly orthogonal to each other. Further disclosed herein are various embodiments of build orientations used to manufacture complex metal structures with a build chamber of a 3D printer.

Embodiments of the method may be used in layered additive manufacturing wherein multiple 2D cross-sections are stacked on top of each other to form a 3D object. These stacked cross-sections may be comprised of discrete 2D layers of continuously changing cross-sections along a path that is orthogonal to the cross-sections being laid down to form the object. The following are summaries of some general embodiments of the methods described in accordance with the present disclosure.

A method of additive manufacturing a component having orthogonal surfaces is disclosed. The method may include establishing an aligned build orientation for the component wherein the orthogonal surfaces of the component are aligned parallel to at least one of the x-, y- and z-axes. The method may further include establishing a secondary build orientation for the component wherein the component is rotated from the aligned build orientation by 45° relative to a secondary axis lying in the x-y plane. Finally, the method may include printing the component.

A method of metal additive manufacturing a component having orthogonal surfaces is disclosed. The method may include providing an additive manufacturing printer, the printer having x-, y- and z-axes and a build chamber with an x-y plane oriented build plate from which the component is constructed with planar slices added in a positive z-axis (zenith) direction. The method may further include establishing an aligned build orientation for the component wherein the orthogonal surfaces of the component are aligned parallel to at least one of the x-, y- and z-axes. The method may further include establishing a secondary build orientation for the component wherein the component is rotated from the aligned build orientation by about 45° relative to a secondary axis lying in the x-y plane. The method may further include establishing an optimized build orientation for the component, wherein the component is optimally rotated from the secondary build orientation along an optimal axis, the optimal axis also lying in the x-y plane and further perpendicular to the secondary axis. Finally, the method may further include printing the component.

A method of metal additive manufacturing an antenna component having internal orthogonal waveguide surfaces is disclosed. The method may include providing an additive manufacturing printer, the printer having x-, y- and z-axes and a build chamber with an x-y plane oriented build plate from which the component is constructed with planar slices added in a positive z-axis (zenith) direction. The method may further include establishing an aligned build orientation for the component wherein the orthogonal surfaces of the component are aligned parallel to at least one of the x-, y- and z-axes. The method may further include establishing a secondary build orientation for the component wherein the component is rotated from the aligned build orientation by about 45° relative to the x-axis. The method may further include establishing an optimized build orientation for the component, wherein the component is optimally rotated from the secondary build orientation along the y-axis. Finally, the method may further include printing the antenna component.

Additional features and advantages of the embodiments described herein will be apparent from the detailed description which follows, taken in conjunction with the accompanying drawings, which together illustrate, by way of example, features of embodiments of the present disclosure.

BRIEF DESCRIPTION OF THE SEVERAL VIEWS OF THE DRAWINGS

The following drawings illustrate exemplary embodiments for carrying out the systems, methods, and devices for three-dimensional printing described herein. Like reference numerals refer to like parts in different views or embodiments of the present disclosure in the drawings.

DETAILED DESCRIPTION

Figure 1:
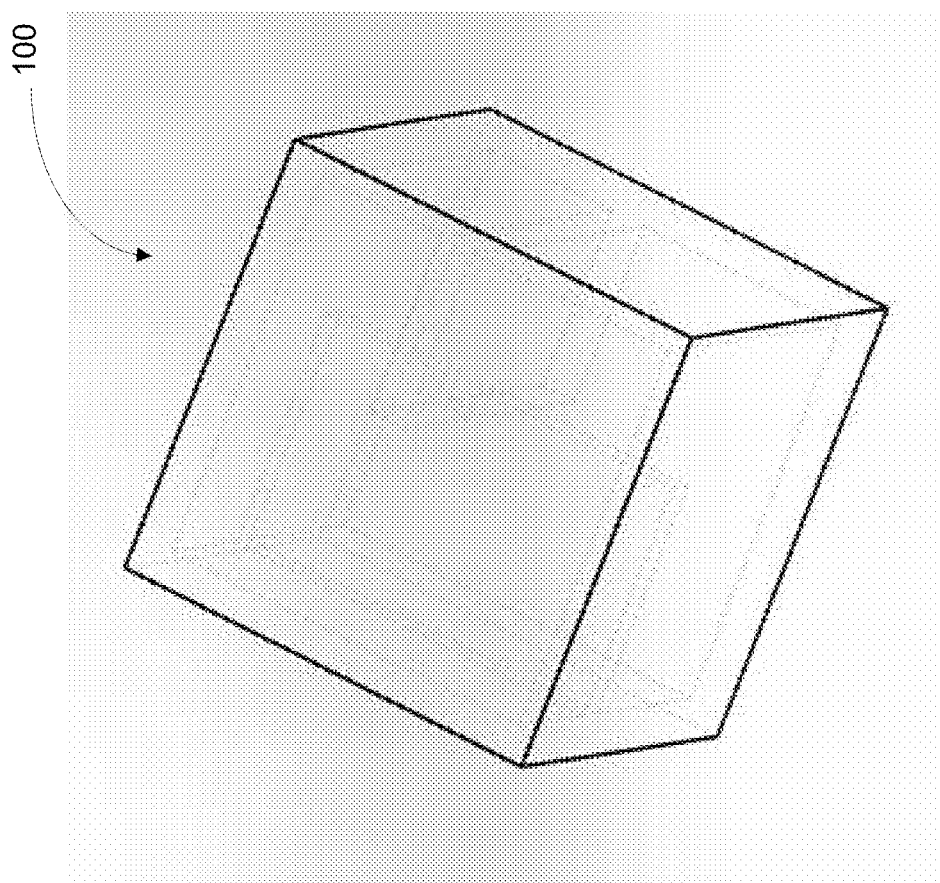
FIG. 1 is a perspective view of a computer-rendered representation of a cube-like structure with multiple surfaces that are significantly orthogonal to each other including some surfaces that are internal to the enclosure of the cube-like structure shown in dashed lines, in accordance with the present disclosure.

The particular build orientation used in fabrication of a part plays a significant role in optimizing the support design. The resulting geometric integrity, surface roughness, and consistency of a part manufactured using a given additive manufacturing technique changes drastically between print orientations.

Embodiments of the present disclosure include special build orientations of a particular kind of part relative to the 3D printing build chamber. This orientation results in minimized support structure and minimized surface distortion at areas where print exposure cross-sections change dramatically. The parts that benefit most from this embodiment are those comprised of significantly orthogonal surfaces including some internal to the shape of the part where it is difficult to remove support structure. By using the novel build orientation described herein, the need for such internal support structure is minimized.

For the purposes of this description, the direction of growth over time is called the positive z-axis, or "zenith" while the opposite direction is the negative z-axis or "nadir". The nadir direction is sometimes referred to as "downward" although the orientation of the z-axis relative to gravity makes no difference in the context of this disclosure. The direction of a surface at any given point is denoted by a vector that is normal to that surface at that point and pointing away from the solid surface. The angle between that vector and the negative Z-axis is the "overhang angle". The term "substantially orthogonal" as used herein refers to surfaces of a complex 3D component having orthogonal (at 90° to each other, i.e., perpendicular) or nearly orthogonal surfaces that intersect each other, i.e., intersecting surfaces that are from 0°-15° away from strictly perpendicular to each other. The terms "build slices" and "exposure planes" are used synonymously herein to describe substantially planar layers formed during an additive manufacturing process. The terms "lattice", "structural lattice" and "lattice support structure" are used synonymously herein to describe physical support structure used to achieve mechanical requirements for the component being manufactured, but are otherwise generally unnecessary for the functionality of the component.

Additive manufacturing (3D printing) has the potential to generate complex single-piece structures that are impossible to fabricate with any other process. However, as noted above there are limitations to additive manufacturing techniques especially when surfaces overhang significantly and support structure is required.

According to embodiments of the present disclosure, surfaces that face within 35°-45° of the build platform nadir will generally require support structure. Overhangs of less than 35° will almost always require support structure. Nevertheless, the methods and teachings of the present disclosure may be used to improve builds using processes that can print surfaces with a smaller threshold, but which still have degraded surface properties with overhangs.

In addition, surfaces that are somewhat downward facing, but not enough to require support structure, will still be rougher than surfaces in a more ideal orientation. The present disclosure addresses the need that exists to be able to print complex geometries without support structure on surfaces that cannot be reached after fabrication is complete and/or the number of required support structures needs to be minimized.

Another challenge with complex geometries in a given component is rapid changes in cross-section for each of the 2D areas that are added to each other (either discretely or continuously). When cross-sections change drastically, stresses and geometric discontinuities result that compromise the geometric and surface integrity of the part. These stresses and geometric discontinuities are generally undesirable in a finished component.

The inventors have unexpectedly discovered that the particular build orientation used in fabrication of a part plays a significant role in optimizing the support structure design. The resulting geometric integrity, surface roughness, and consistency of the part or component may change drastically between print orientations.

Components with complex geometries that have inaccessible or enclosed cavities that are comprised of surfaces, internal or on the extremity of the component, that are orthogonal to each other, or substantially orthogonal to each other, can be printed such that most surfaces are printed with each surface at approximately 55° from the build platform nadir. This particular embodiment of a build orientation enables maze-like geometries with multiple internal cavities to print without support structure so long as the surfaces are significantly orthogonal to each other, according to the present disclosure.

An additive manufacturing printer's coordinate system is dominated by the z-axis and will also be defined with an x-axis and y-axis, each of which are mutually orthogonal. A component or part with significantly orthogonal surfaces, such as a cube, may begin its placement in the printer with its planes lined up with the axes of the printer. In this orientation, one surface will be facing downward. If the cube were hollow, two surfaces would be facing downward. However, starting from this position, the cube can be rotated about the x-axis by 45°, and then rotated again about the printer's y-axis by 35°. Under this new embodiment of a build orientation, the cube's surfaces all have an overhang angle of 55° which is substantially above the general threshold (i.e., 35°-45° of the build platform nadir) for good printing without support structure. The same is true even if the cube were hollow or if there were any number of parallel walls within the cube.

Another benefit to the embodiments of optimal build orientation disclosed herein is that such build orientations result in 2D cross-sections that do not change significantly from one layer to the next. Even slight angles in the print orientation will help two significantly orthogonal plates close up together in a way that produces a consistent component part during manufacturing. The effect is as if the planes zip up together cleanly rather than instantly joining together. Considering a hollow cube, the top three planes will "grow" together at the seams where the planes meet in a continuous manner resulting in clean connections. However, if a hollow cube were printed with one plane aligned with the z-axis, then when the top surface is generated, the cross-section will have instantaneously changed from a hollow box to a solid box. This instantaneous change in cross-section results in significant discontinuities in the resulting shape of the component part.

Even if the cube is only rotated about the x-axis by 45° alone, two surfaces will grow independently and then instantaneously join at the top where they meet. This instantaneous joint will cause deformed geometry at that location. Accordingly, if the print or build orientation is changed only slightly this problem can be resolved. For example, in the example above with the hollow cube. If, starting with the cube aligned with the printer coordinate system, it is rotated about the X-axis by 45° and then about the Y-axis by only 5°, all surfaces will be printing with an overhang angle greater than 45° and the joining between the two top surfaces will be "zipped" together in a gradual manner that distributes stresses, thermal loads, and other factors and results in a better part.

The following description expands upon the novel build orientation introduced above with reference to the drawings. FIG. 1 is a perspective view of an exemplary cube-like structure 100 with multiple surfaces that are significantly orthogonal to each other and including some surfaces that are internal to the enclosure of the cube-like structure shown in dashed lines, according to the present disclosure.

Figure 2:
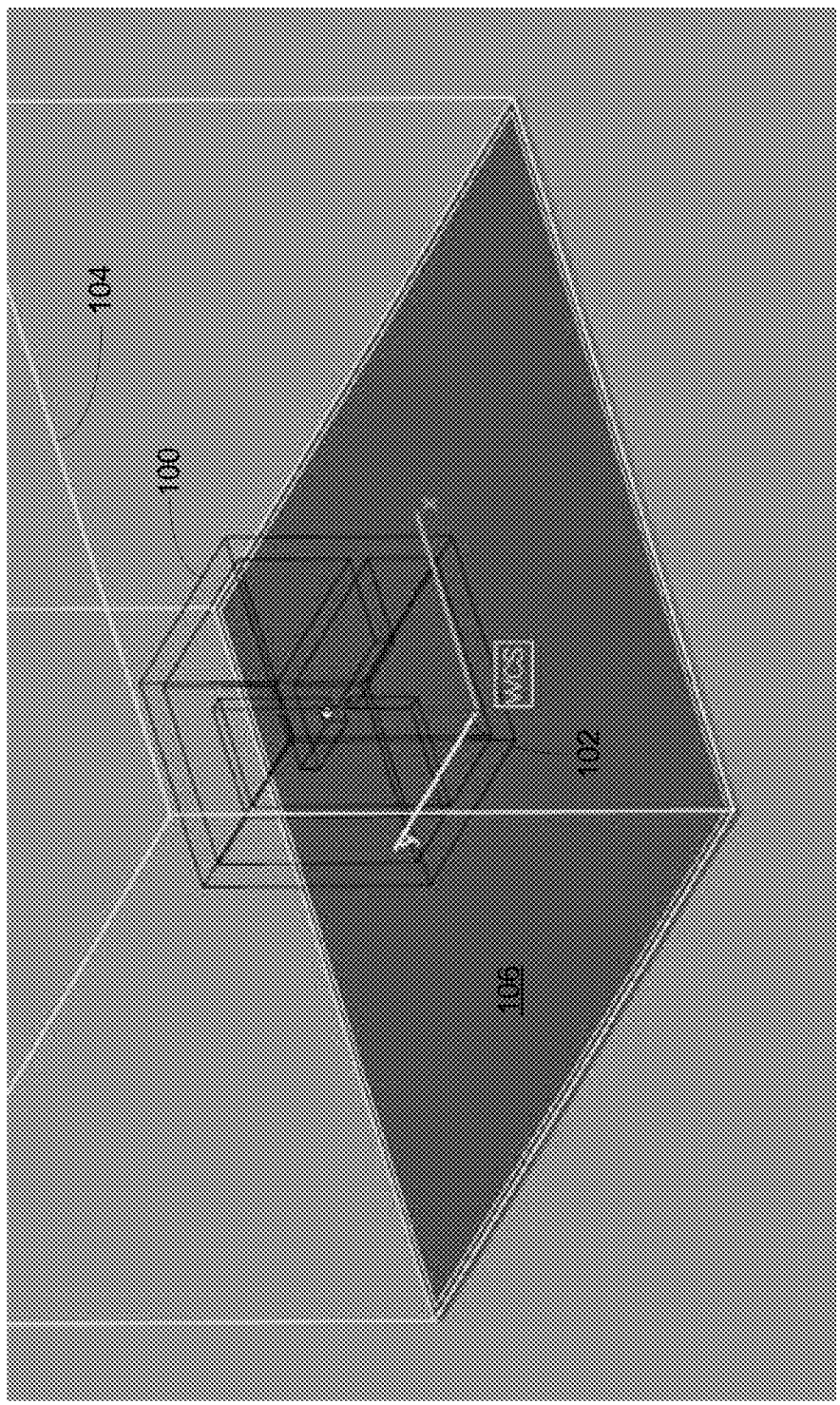
FIG. 2 is a perspective view of the computer-rendered representation of the cube-like structure shown in FIG. 1, with planes significantly lined up with the axis of the 3D printer build chamber, in accordance with the present disclosure.

FIG. 2 is a perspective view of the cube-like structure 100 shown in FIG. 1 with planes significantly lined up with the axes of the 3D printer build chamber 102, according to the present disclosure. As shown in FIG. 2, the axes of the build chamber 102 is shown in colors (blue for x-axis, yellow for y-axis, red for z-axis) in the center. The cavity of the build chamber 104 is shown as a white cubical wireframe surrounding the cube-like structure 100 located in the center of the cavity 104. During fabrication, the cube-like structure 100 is constructed of surface layers built from the floor of the build chamber 106 upward in the +z-axis direction.

Figure 3B:
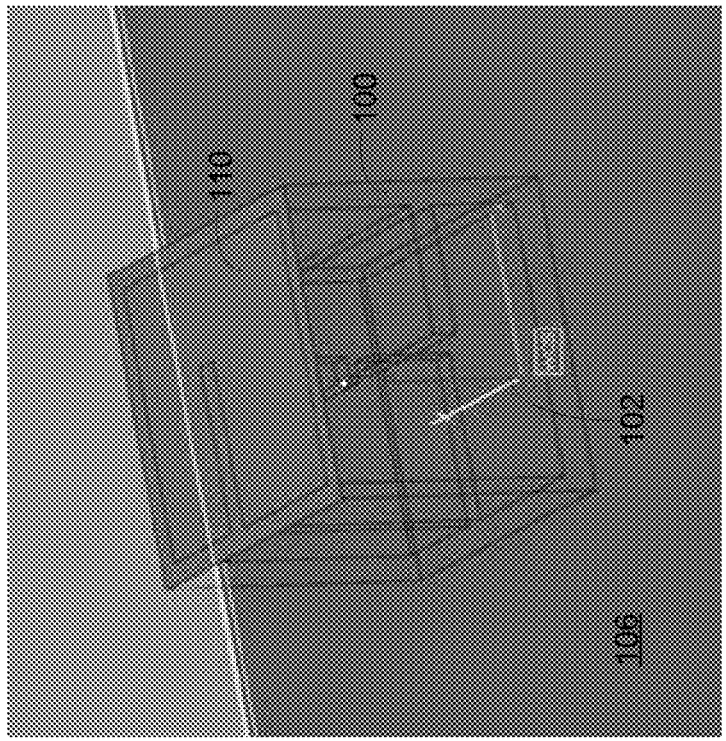
FIGS. 3A and 3B are perspective views of the computer-rendered representation of the cube-like structure shown in FIGS. 1 and 2, highlighting the print slice layer just prior to and after, respectively, the top surface begins to be exposed during printing from a metal feedstock with a metal additive manufacturing printer, in according with the present disclosure.
Figure 3A:
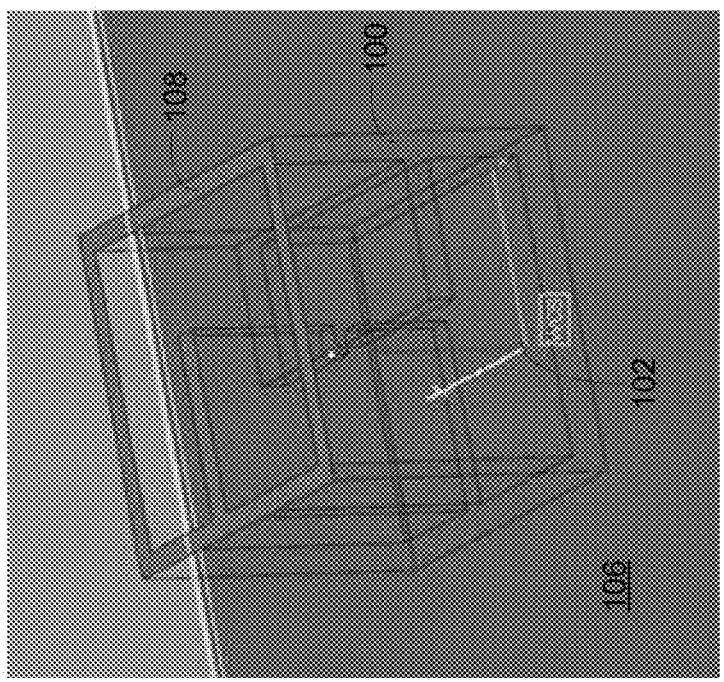

FIGS. 3A and 3B are perspective views of the cube-like structure shown in FIGS. 1 and 2 highlighting the print slice layer just prior to 108 (FIG. 3A) and after 110 (FIG. 3B), respectively, that the top surface begins to be exposed during printing, according to the present disclosure. The term "exposed" as used herein is a term of art in the additive manufacturing industry and refers to the fabrication of multiple, sequential, exposure layers during the additive manufacturing process. The print slice layers 108 and 110 shown in FIGS. 3A and 3B demonstrate two significant problems encountered in additive manufacturing. First, the cross-sectional areas of the print slice layers change drastically from the print slice layer 108 illustrated in FIG. 3A relative to the print slice layer 110 shown in FIG. 3B. This drastic change in cross-section will cause significant shrinkage and distortion lines to show up on other surfaces at those layer interfaces in the final part as fabricated. Second, it will be understood that the surface formed by print slice layer 110 shown in FIG. 3B would normally require internal support structure, for example, and not by way of limitation, to keep the top surface layer from caving in. However, since support side of the surface is internal to the cube-like structure, it would be difficult to remove any such support structure that was used during the printing process.

Figure 4:
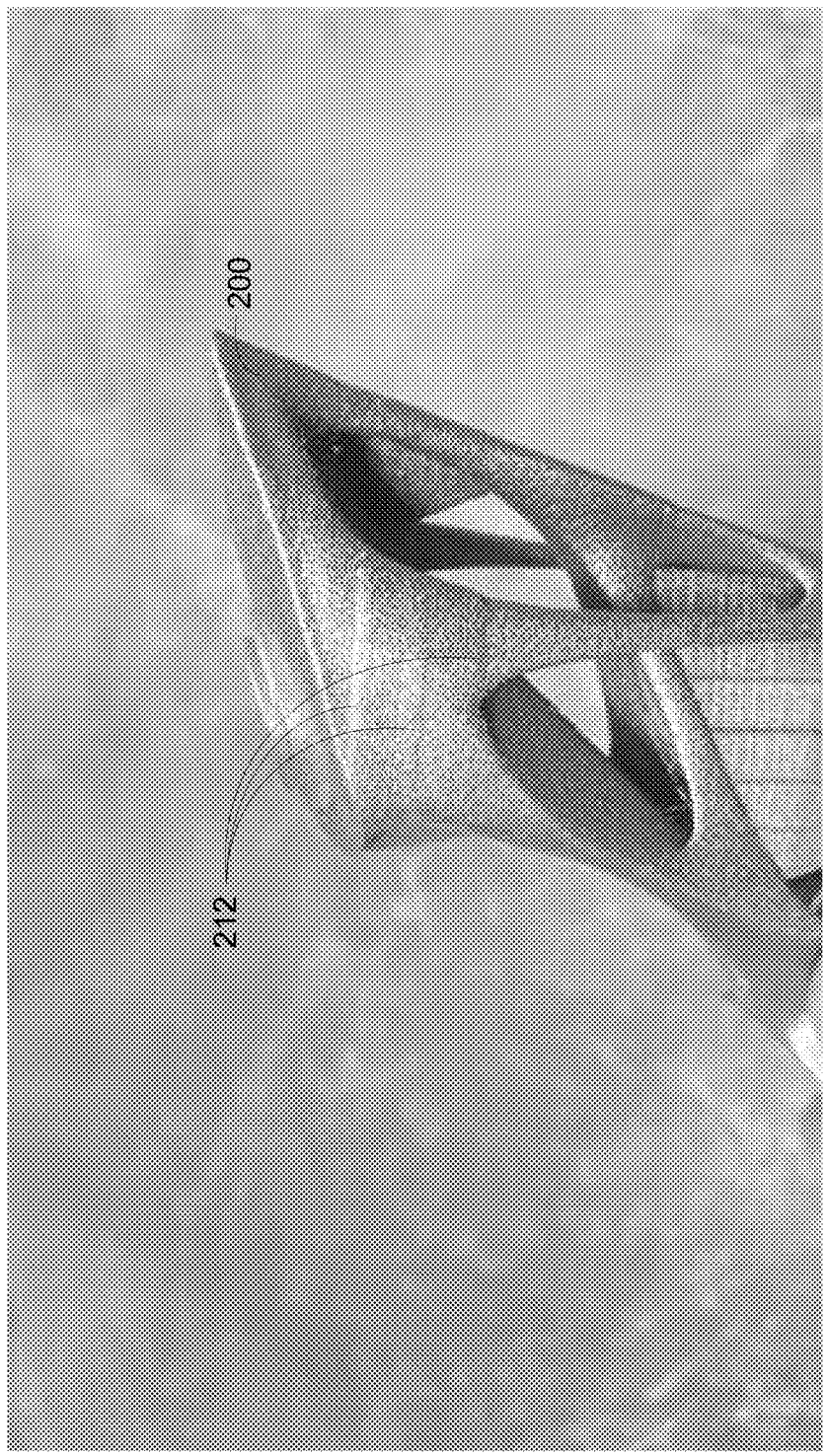
FIG. 4 is an image depicting a perspective image of an exemplary physically printed metal part that was printed from a metal feedstock with a metal additive manufacturing printer, wherein the physically printed metal part comprises multiple locations where the cross-section changed drastically from one layer to the next causing visible lines and distortions to show up in the part, in accordance with the present invention.

FIG. 4 is a perspective image of an exemplary printed part 200 showing multiple locations 212 where the cross-section changed drastically from one layer to the next causing visible lines and distortions to show up in the part 200, according to the present disclosure. These distortions are undesirable in any precision component and can generate defects that may require costly and time-consuming post fabrication machining to correct, or lead to structural failures that require scrapping the given part altogether.

Figure 5A:
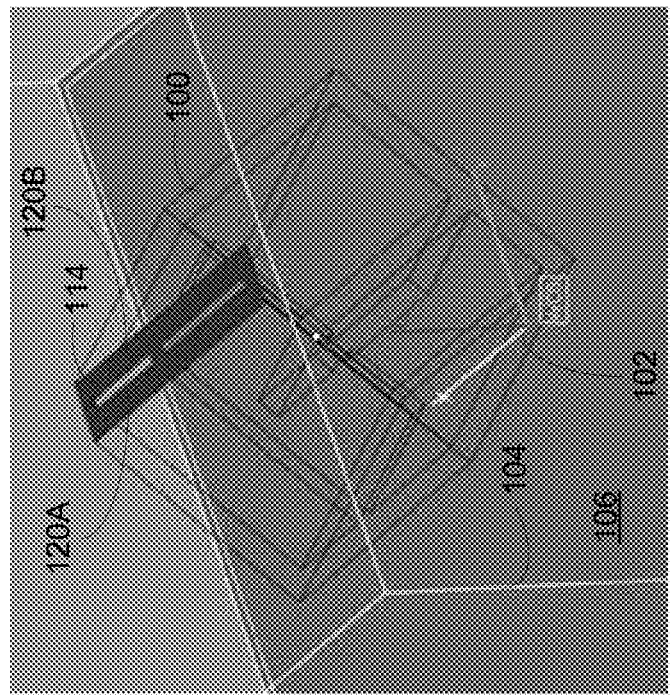
FIGS. 5A and 5B are perspective views of the computer-rendered representation of the cube-like structure shown in FIGS. 1, 2, 3A and 3B, additionally highlighting the print slice layer just prior to and after, respectively, the top surface begins to be exposed during printing from a metal feedstock with a metal additive manufacturing printer, however, the cube-like structure is rotated 45° about the y-axis relative to FIGS. 3A and 3B, in accordance with the present disclosure.
Figure 5B:
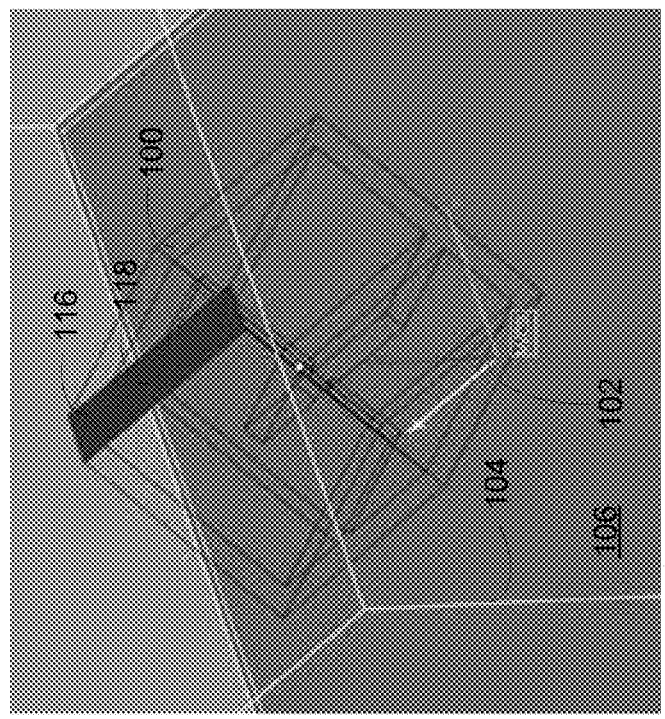

FIGS. 5A and 5B are perspective views of the cube-like structure 100 shown in FIGS. 1, 2, 3A and 3B as shown in a build chamber having cavity 104, floor 106 and print axis 102. FIGS. 5A and 5B also highlight another print slice layer just prior to 114 and after 116, respectively, that the top surface of the cube-like structure 100 begins to be exposed during printing, according to the present disclosure. However, in FIGS. 5A and 5B, the cube-like structure is rotated 45° about the y-axis relative to FIGS. 3A and 3B. Two slice exposure layers 114 and 116 are shown in FIGS. 5A and 5B. More particularly, FIG. 5A illustrates a print slice 114 just before two opposing planes 120A-B re-connect as the layers are added in the z-axis direction. Whereas, FIG. 5B illustrates a print slice 116 just after the two opposing planes reconnect as an undivided plane. This build orientation improves on the build orientation shown in FIG. 2 in that no support structure is needed inside the cube-like structure. However, distortions may still result at the slice location 118 where the two opposing planes suddenly reconnect.

Figure 6:
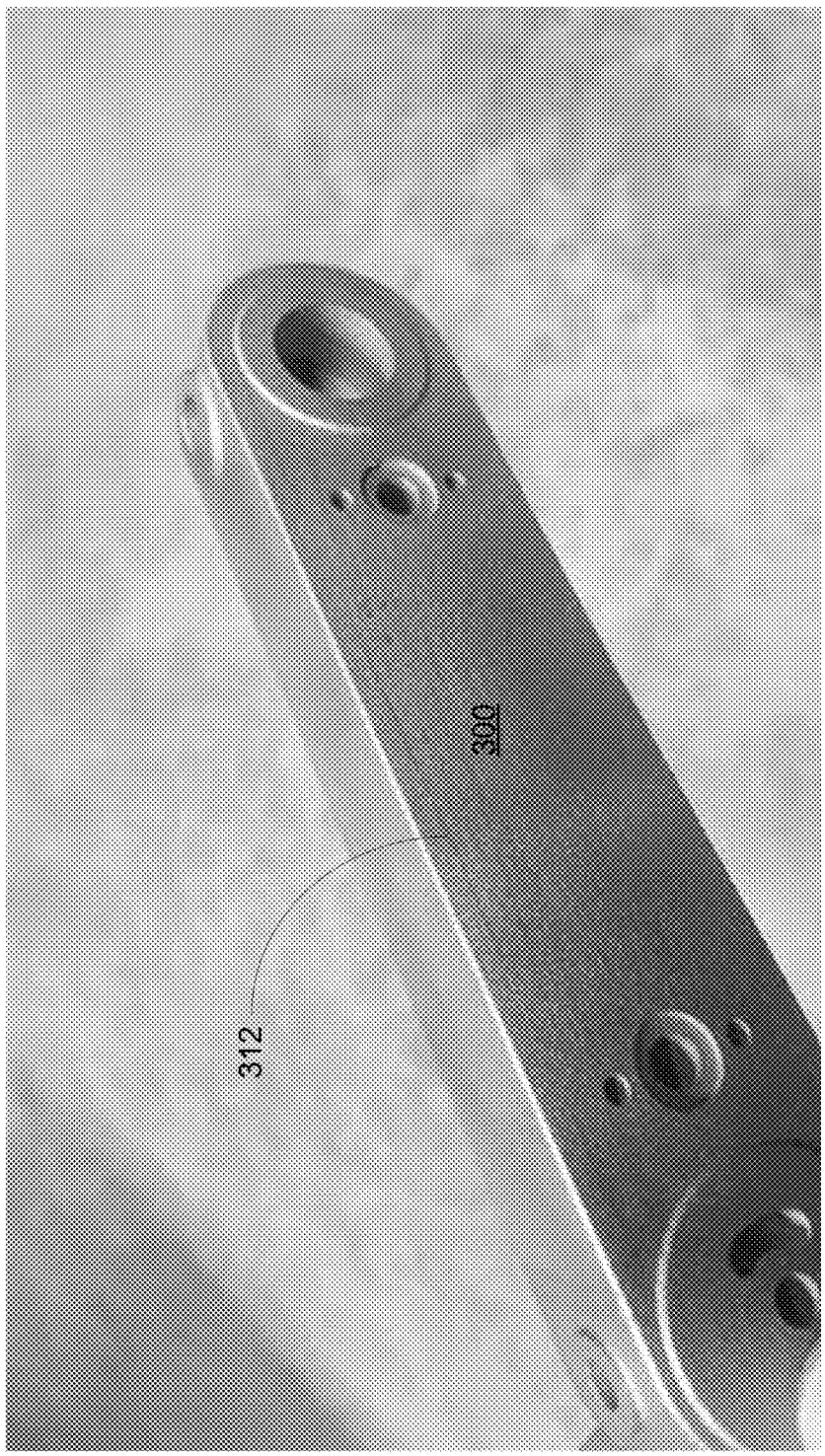
FIG. 6 is an image depicting a perspective view of an exemplary physically printed metal part that was printed from a metal feedstock with a metal additive manufacturing printer, wherein the physically printed metal part includes a print seam line shown where two orthogonal planes intersect, in accordance with the present disclosure.

FIG. 6 is a perspective view of another exemplary part 300 illustrating a print seam line 312 shown where two orthogonal planes intersect, according to the present disclosure. As shown in FIG. 6, the exemplary part 300 has been printed with two orthogonal planes that were perpendicular to each other (one plane internal to the part shown and not visible). The seam 312 between the two orthogonal planes was parallel with the XY plane during the build. Just below the location where the two orthogonal planes intersect, a seam line 312 can be seen where the re-attaching walls caused the shape to shift.

Figure 7:
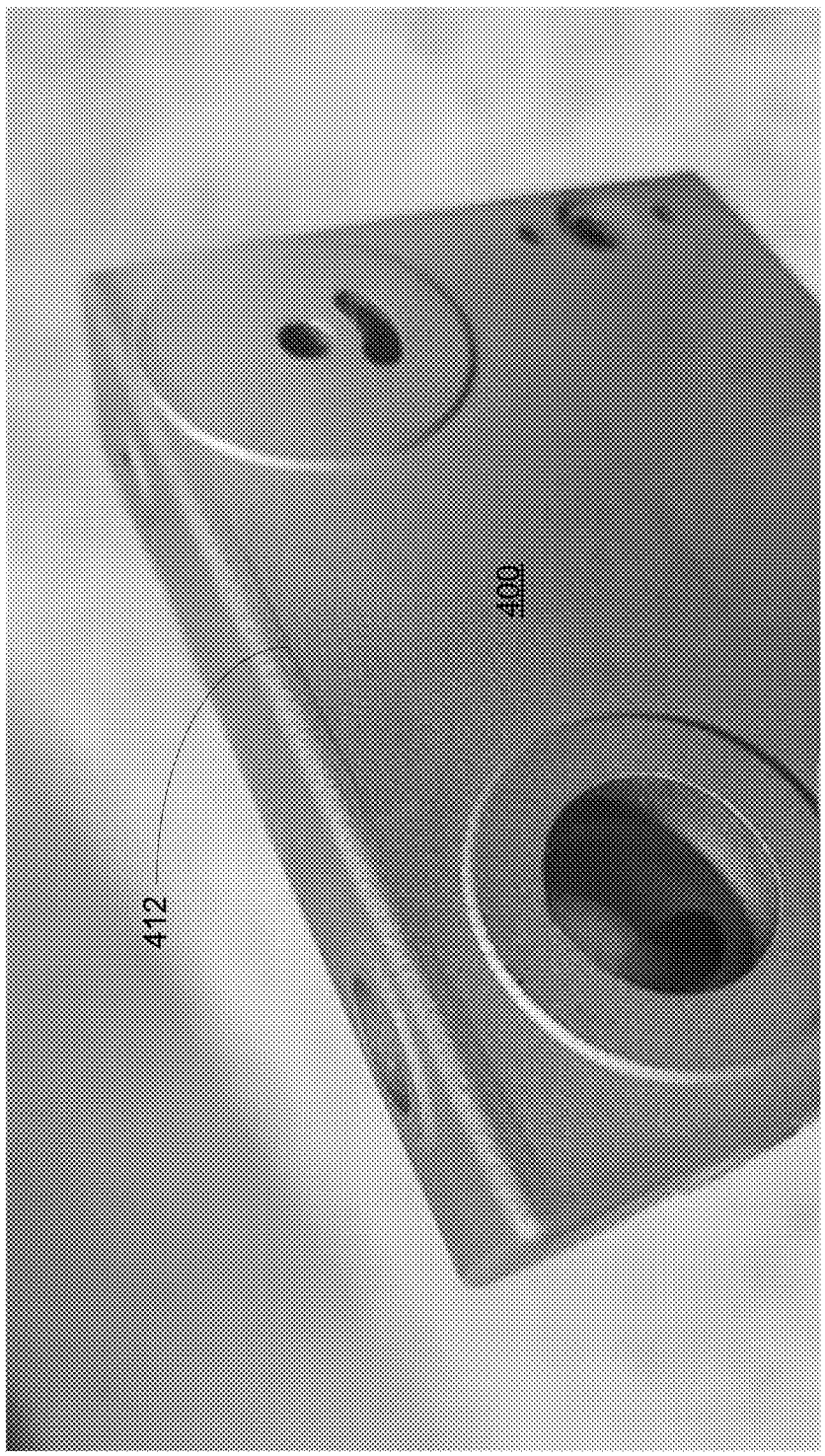
FIG. 7 is an image depicting a perspective view of an exemplary physically printed metal part that was printed from a metal feedstock with a metal additive manufacturing printer, wherein the physically printed metal part includes a print seam line shown where two orthogonal planes intersect, in accordance with the present disclosure.

FIG. 7 is a perspective view of yet another exemplary part 400 illustrating another print seam line 412 shown where two orthogonal planes intersect. More particularly, FIG. 7 again illustrates yet another exemplary part 400 printed with two orthogonal planes that are perpendicular to each other and where the intersection between those two orthogonal planes forms a seam 412 between them. The seam 412 was parallel with the XY plane during the build. As shown in FIG. 7, the seam line 412 is located just below the line of intersection between those two orthogonal planes where the re-attaching walls caused the shape to shift. It will be understood that these seam line defects, 212 (FIG. 4), 312 (FIG. 6) and 412 (FIG. 7) are all undesirable artifacts created during conventional metal additive manufacturing techniques.

Figure 8:
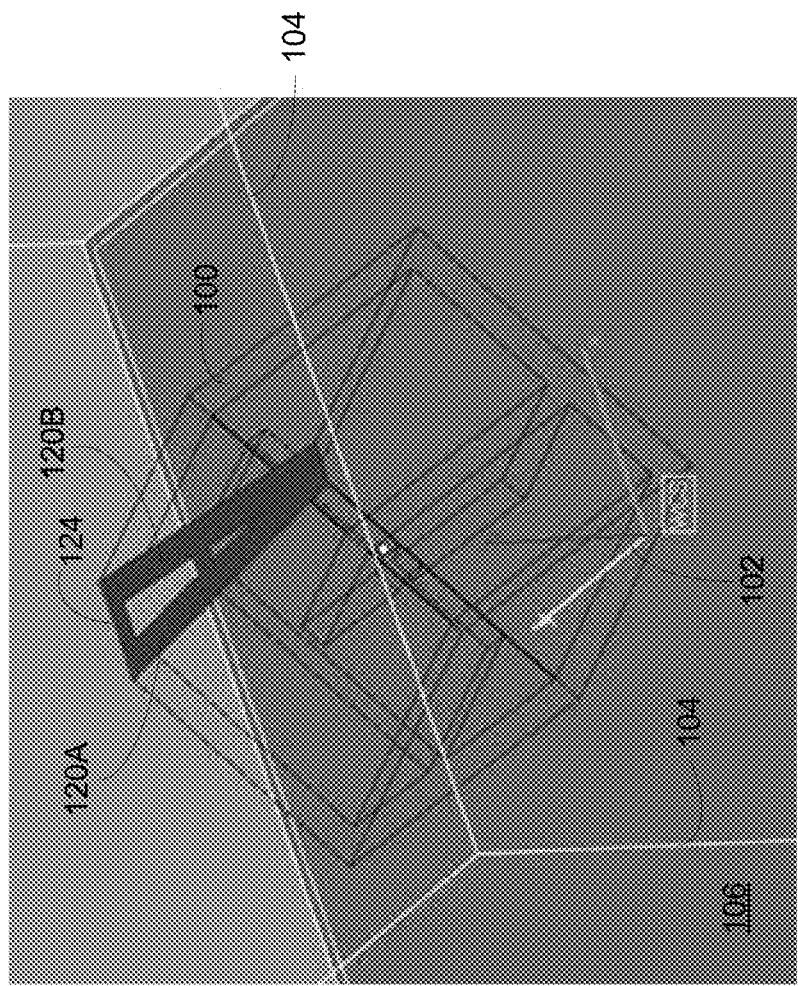
FIG. 8 is a perspective view of the computer-rendered representation of the cube-like structure and build chamber shown in FIGS. 1, 2, 3A, 3B, 5A and 5B that has been rotated 45° about the y-axis but also rotated 5° about the x-axis, in accordance with the present disclosure.

FIG. 8 is a perspective view of the cube-like structure 100 and build chamber having cavity 104 and floor 106 shown in FIGS. 1, 2, 3A, 3B, 5A and 5B. However, the cube-like structure 100 shown in FIG. 8 has been rotated 45° about the y-axis and also rotated 5° about the x-axis, according to the present disclosure. By selecting this particular embodiment of a build orientation, the exposure v-planes 122A-B in each successive re-connecting build surface 124 do not re-connect all at once. Instead, the v-planes 122A-B are "zipped up" over multiple layers, ensuring a more gradual transition and significantly reducing the distortion that otherwise would occur at that location.

Figure 9:
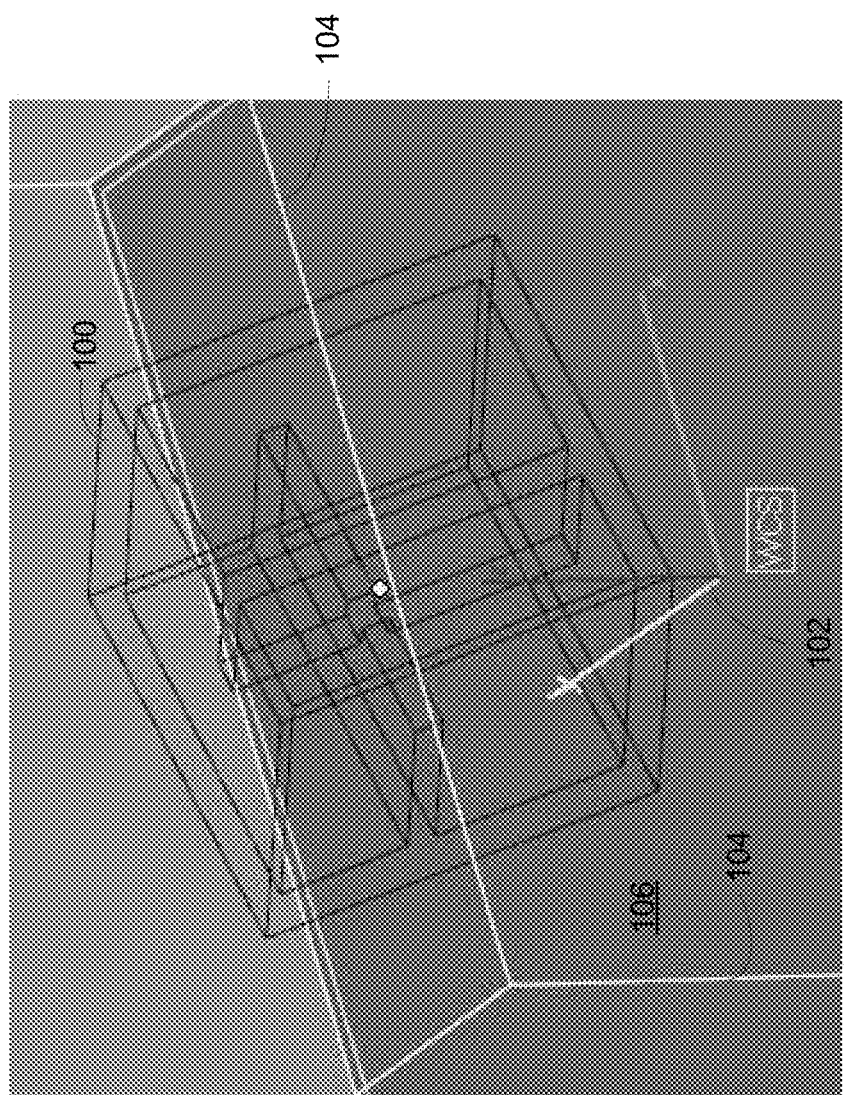
FIG. 9 is a perspective view of the computer-rendered representation of the cube-like structure in the build chamber as shown in FIGS. 1, 2, 3A, 3B, 5A, 5B and 8, but with the computer-rendered representation of the cube-like structure rotated 45° about the y-axis and then rotated again 35° about the x-axis (orthogonal view), in accordance with the present disclosure.

FIG. 9 is a perspective view of the cube-like structure in the build chamber having cavity 104 and floor 106 as shown in FIGS. 1, 2, 3A, 3B, 5A, 5B and 8. However, from the aligned build orientation shown in FIG. 2, the cube-like structure 100 has been rotated 45° about the y-axis (secondary build orientation) and then rotated 35° about the x-axis (to achieve the optimized build orientation), according to the present disclosure. Note that in this embodiment of an optimized build orientation, no surface of the cube-like structure 100 is at an angle lower than 55° from the nadir direction.

Figure 10B:
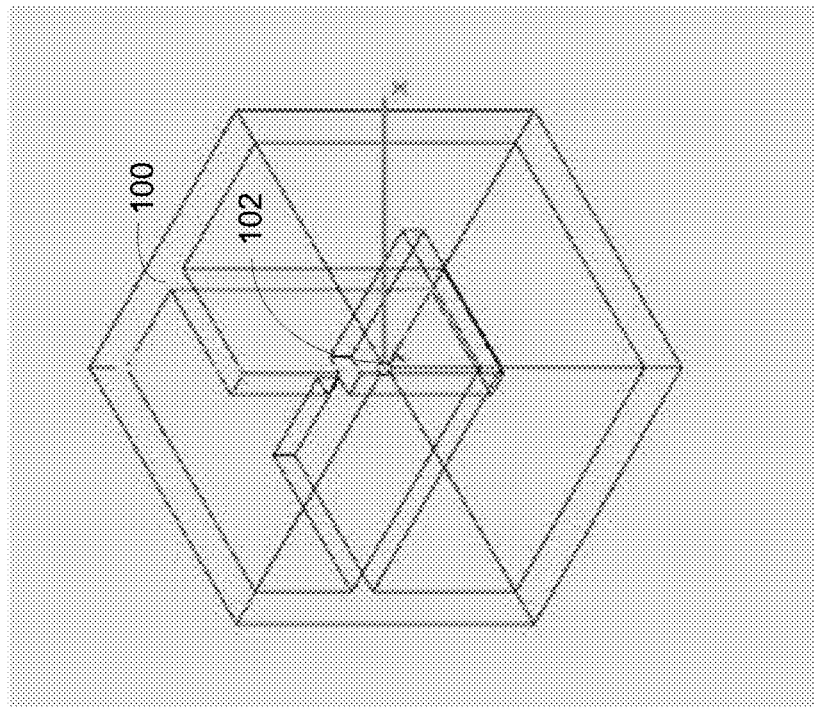
FIGS. 10A and 10B are side and top view, respectively, of the computer-rendered representation of the cube-like structure and build orientation shown in FIG. 9, in accordance with the present disclosure.
Figure 10A:
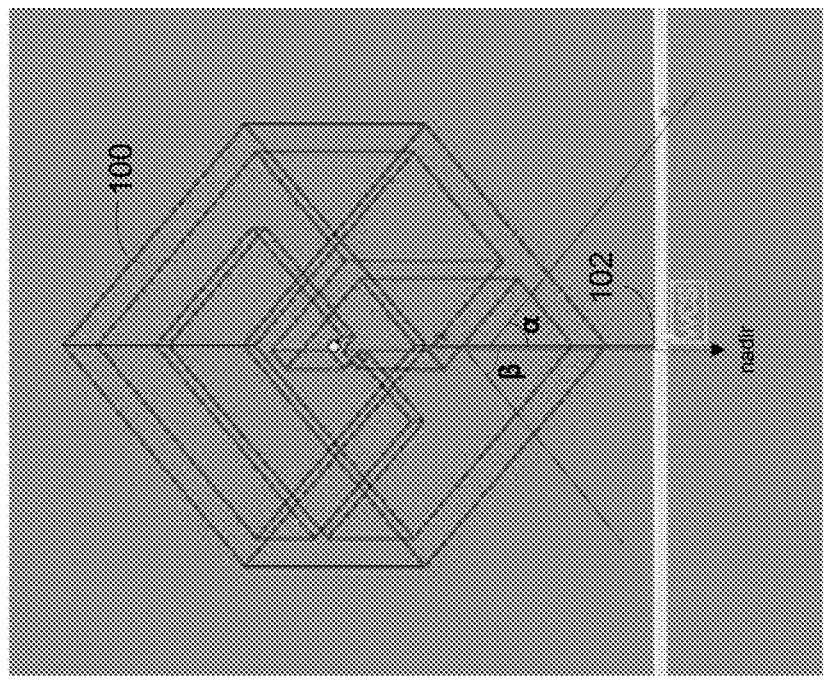
Figure 11A:
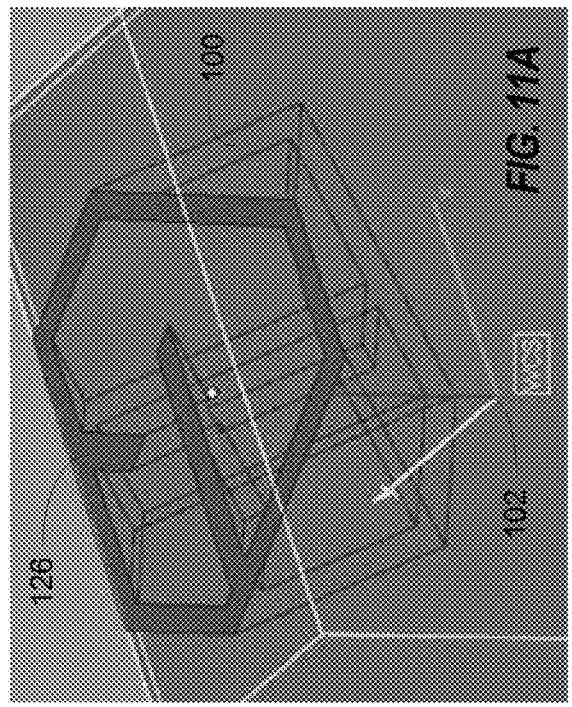
FIGS. 11A-11D are various build slices of the computer-rendered representation of the cube-liked structure from the embodiment of a build orientation shown in FIG. 9, in accordance with the present disclosure.
Figure 11B:
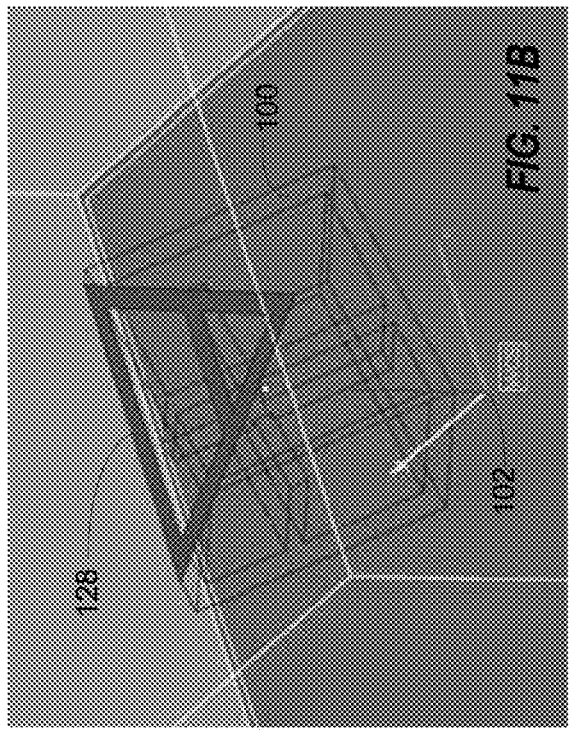
Figure 11C:
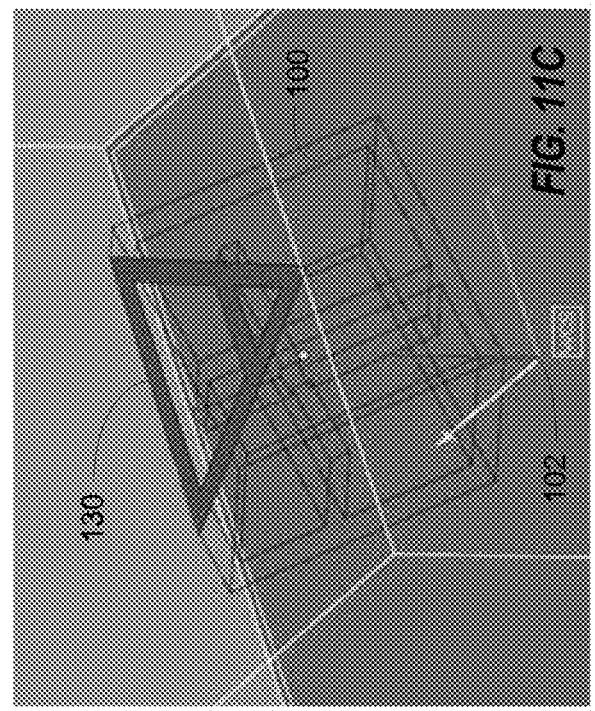
Figure 11D:
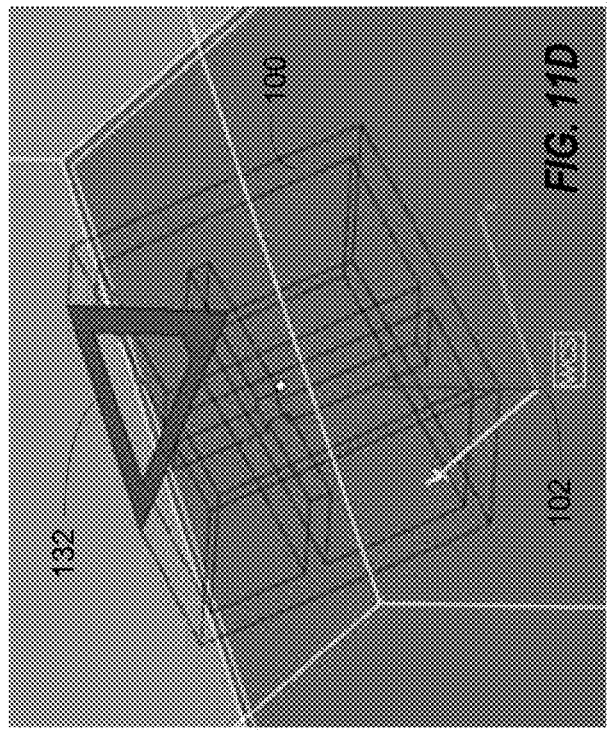

FIGS. 10A and 10B are side and top views, respectively, of the cube-like structure 100 in the build orientation shown in FIG. 9, according to the present disclosure. Recall that this embodiment of a build orientation takes the cube-like structure 100 initially oriented with a given corner located at the origin of the build axes 102 with orthogonal edges running along the x, y and z axes. This initial orientation may be referred to herein as an "aligned" build orientation. From this aligned build orientation, the cube-like structure 100 is then rotated 45° about the y-axis to obtain a secondary build orientation. Finally, from the secondary build orientation, the cube-like structure 100 is rotated 35° about the x-axis to achieve an optimized build orientation.

It will be understood that any given corner could be used to establish the aligned build orientation, since all of external and internal surfaces of the cube-like structure 100 are orthogonal. It will be further understood that the cube-like structure 100 in the aligned build orientation could alternatively be rotated 45° about the x-axis and further rotated 35° about the y-axis to achieve an optimized build orientation. Finally, it will be understood that this embodiment of an "optimized" build orientation may be used successfully even with parts that have internal and external surfaces that are just substantially orthogonal to one another rather than strictly orthogonal.

From the views of FIGS. 10A and 10B, one can more readily ascertain that in this embodiment of a build orientation of the cube-like structure 100 shown in FIG. 9 (and reproduced in the views of FIGS. 10A and 10B), no surface (internal or external) of the cube-like structure 100 is at an overhang angle lower than 55° from the nadir (−z-axis) direction. This "overhang angle" for any given surface is measured from a perpendicular to the given surface and the nadir. Two representative overhang angles, α and β, are illustrated in FIG. 10A.

FIGS. 11A-11D are various build slices, 126, 128, 130 and 132 from the embodiment of an optimized build orientation shown in FIG. 9, according to the present disclosure. The cube-like structure 100 with optimized build orientation shown in FIGS. 11A-11D highlights multiple exposure planes, 126, 128, 130 and 132 that would be formed according to the embodiment of an optimized build orientation. Using the build orientation illustrated in FIGS. 9, 11A-11D, two novel aspects can be observed: First, no support structure is required on any of the internal surfaces. Second, no cross-section (or build slice, or exposure plane) makes a drastic cross-sectional change at any point in the print, resulting in a clean part (lacking seams and other defects) throughout the fabrication process.

Figure 12:
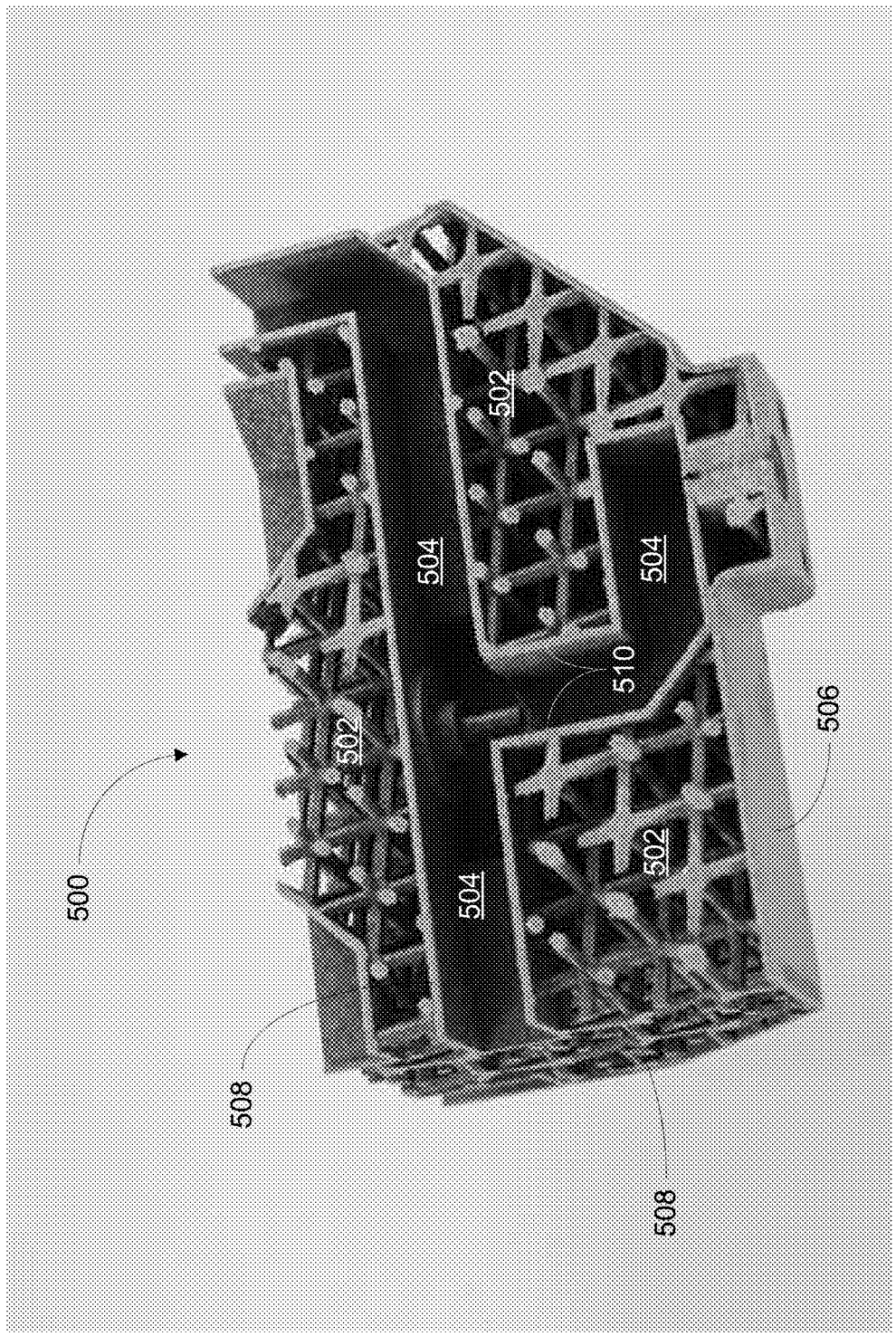
FIG. 12 is an image depicting a perspective cross-sectional view of an exemplary physically printed metal component that was printed from a metal feedstock with a metal additive manufacturing printer, wherein the physically printed metal component includes geometry with multiple surfaces that are significantly orthogonal to each other including internal surfaces that cannot be reached from the outside, in accordance with the present disclosure.

FIG. 12 is a perspective cross-sectional view of an exemplary component 500, according to the present disclosure. Component 500 may include geometry having multiple internal surfaces, e.g., surfaces 508 and 510 that are significantly orthogonal to each other, neglecting the lattice support structure 502 located outside of desired internal cavities 504. Lattice support structure 502 may be located between the outer skin 506 and internal surfaces 508, 510 that are difficult to reach from outside the component 500. In general lattice support may be used internally to physically support internal surfaces, but only in locations where the lattice support does not impact the functionality and surface finish required in the desired internal cavities 504. In the component 500 shown in FIG. 12 the surfaces of interest (wave guide cavities 504 in this case) do not include the structural lattice 502.

Figure 13:
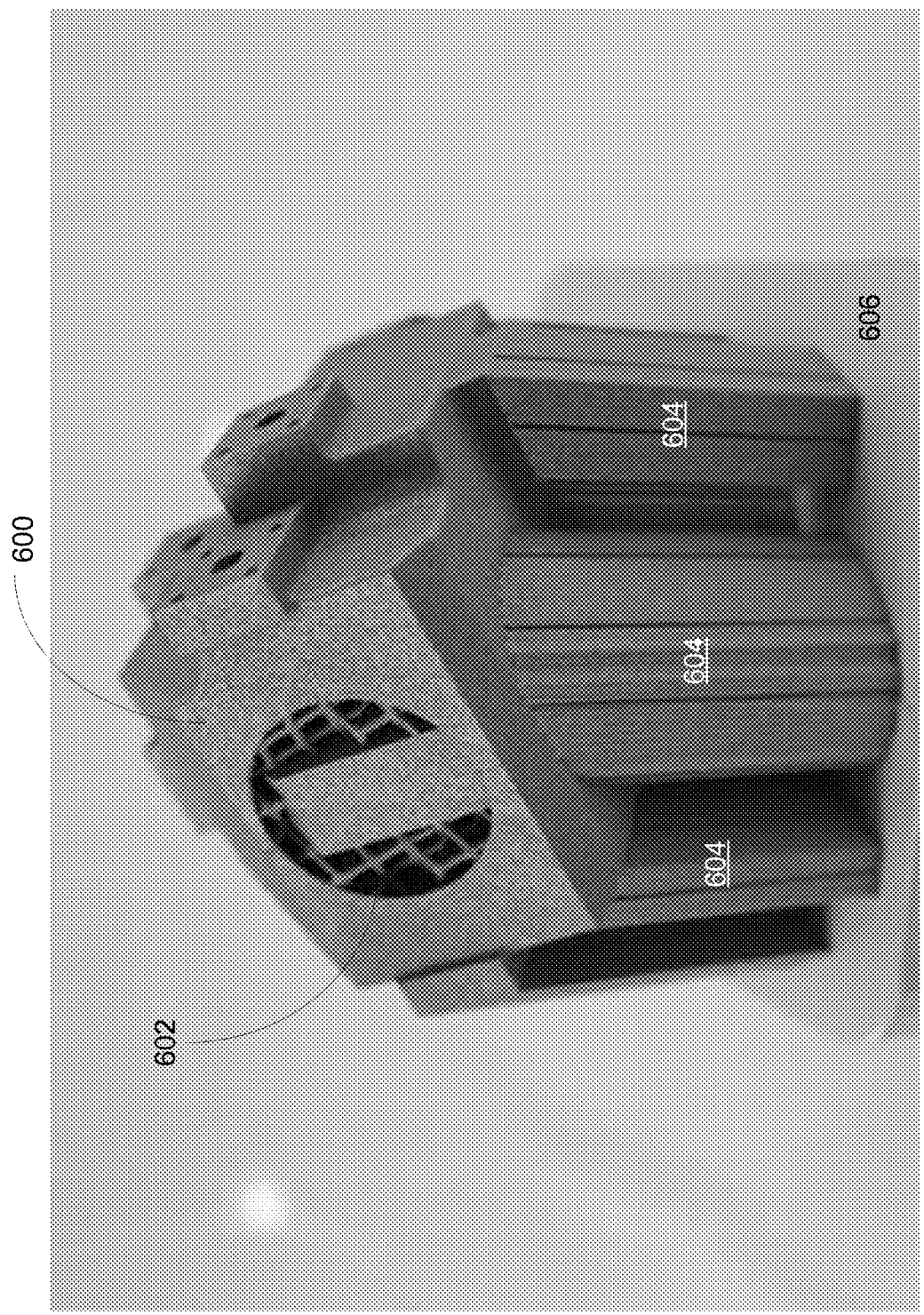
FIG. 13 is an image depicting a perspective view of an exemplary physically printed metal component that was printed from a metal feedstock with a metal additive manufacturing printer, wherein the physically printed metal component includes a geometry with multiple surfaces that are significantly orthogonal to each other including surfaces that cannot be reached from the inside, in accordance with the present disclosure.

FIG. 13 is a perspective view of another component 600 having a geometry with multiple internal (not shown) and external surfaces that are significantly orthogonal to each other including surfaces that cannot be reached from the inside, according to the present disclosure. FIG. 13 shows the component 600 printed in an optimized build orientation still on the build plate 606 (of the 3D printer) with support lattice structure 602 supporting desired internal surfaces (not shown) and also external support structure 604 secured to exterior surfaces. The external support structure 606 may be subsequently removed to obtain the finished printed component 600.

Figure 14:
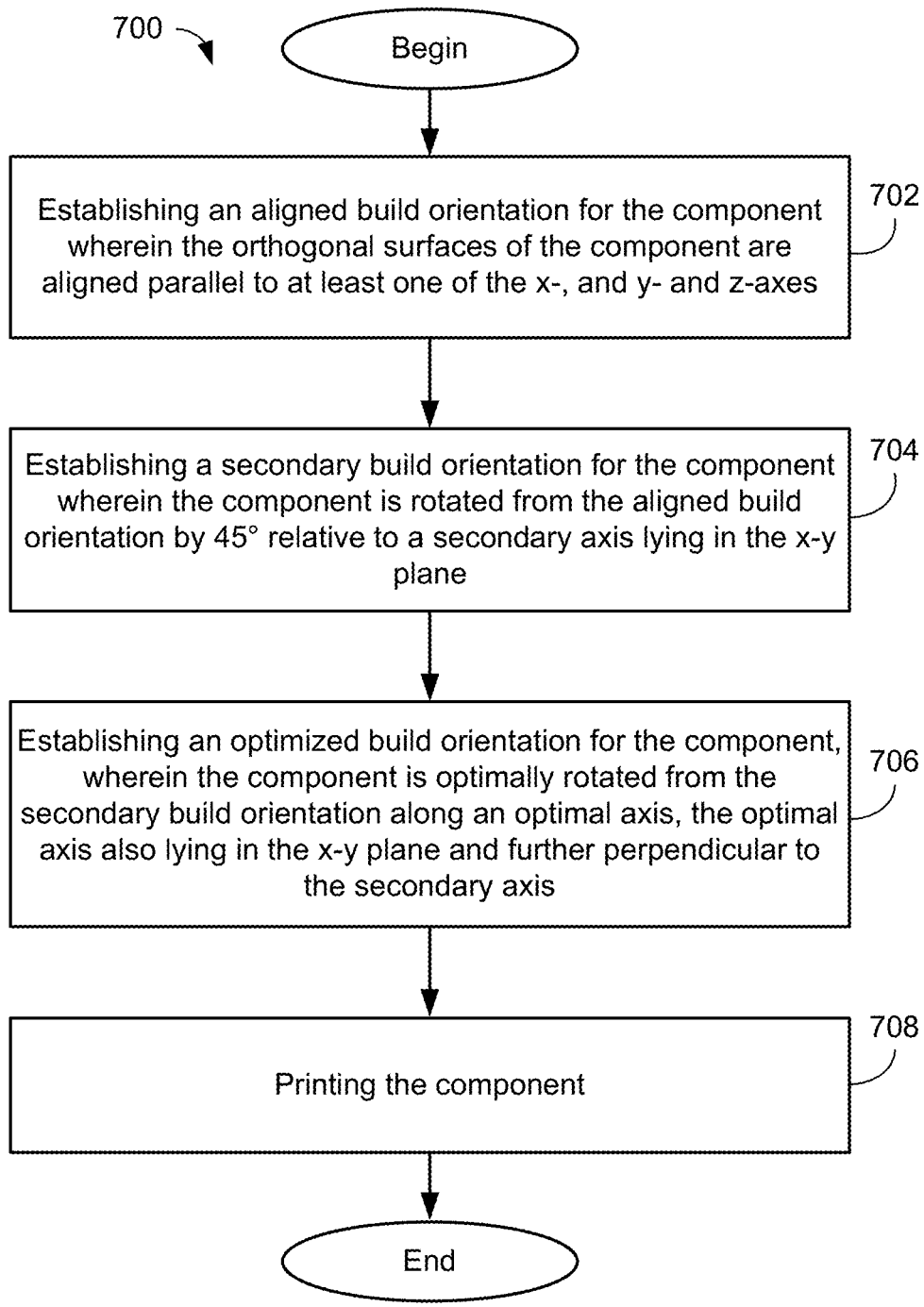
FIG. 14 is a schematic flowchart diagram of a method of 3D additive manufacturing of a component using a 3D printer, in accordance with the present disclosure.

FIG. 14 is a flowchart of an embodiment of a method 700 of 3D additive manufacturing of a component using a 3D printer, according to the present disclosure. According to an embodiment of the method 700, the component may have orthogonal surfaces, either internally or along outer extremities. According to an embodiment of the method 700, the 3D printer may include x-, y- and z-axes, and a build chamber with an x-y plane oriented build plate from which the component is constructed with planar slices added in a positive z-axis direction.

Method 700 may include establishing an aligned build orientation for the component 702 wherein the orthogonal surfaces of the component are aligned parallel to at least one of the x-, y- and z-axes. Method 700 may further include establishing a secondary build orientation 704 for the component wherein the component is rotated from the aligned build orientation by 45° relative to any secondary axis lying in the x-y plane, the x-y plane containing the x-axis and y-axis. Method 700 may further include printing the component 708. According to another embodiment, method 700 may further include establishing an optimized build orientation for the component 706, wherein the component is optimally rotated from the secondary build orientation along any optimal axis, the optimal axis also lying in the x-y plane and further perpendicular to the secondary axis, prior to the step of printing the component 708.

According to another embodiment of method 700, the step of establishing an optimized build orientation for the component 706, wherein the component is optimally rotated from the secondary build orientation comprises optimally rotating the component in a range from 1° to 35° around the optimal axis, prior to the step of printing the component 708. According to yet another embodiment of method 700, the step of establishing an optimized build orientation for the component 706, wherein the component is optimally rotated from the secondary build orientation comprises optimally rotating the component 35° around the optimal axis, prior to the step of printing the component 708.

According to another embodiment, method 700 may further include providing an additive manufacturing printer. The printer may include x-, y- and z-axes and a build chamber with an x-y plane oriented build plate from which the component is constructed with planar slices added in a positive z-axis direction. According to yet another embodiment, method 700 may further include establishing an optimized build orientation for the component within the build chamber. According to this embodiment, the optimized build orientation may be achieved when the component is optimally rotated from the secondary build orientation along an optimal axis. According to this embodiment, the optimal axis may also lie in the x-y plane and also perpendicular to the secondary axis. The optimized build orientation is preferably established prior to printing the component.

According to yet another embodiment of method 700, establishing an optimized build orientation for the component may include optimally rotating the component in a range from 1° to 35° around the optimal axis. According to this embodiment, the optimal axis may also lie in the x-y plane and also perpendicular to the secondary axis. The optimized build orientation is preferably established prior to printing the component. According to yet another embodiment of method 700, establishing an optimized build orientation for the component may include optimally rotating the component 35° around the optimal axis.

According to still another embodiment of method 700, providing an additive manufacturing printer may include providing a metal additive manufacturing printer. According to another embodiment of method 700, the component may be an antenna waveguide. According to further embodiments, the antenna waveguide may include orthogonal internal surfaces and/or orthogonal external surfaces. According to yet another embodiment of method 700, an overhang angle may be defined between a perpendicular line extending from any surface and the negative z-axis (nadir) direction. According to this embodiment of method 700, the overhang angle, α, falls in the range, $35° \leq \alpha \leq 55°$ in order to avoid the need for support structure.

Figure 15:
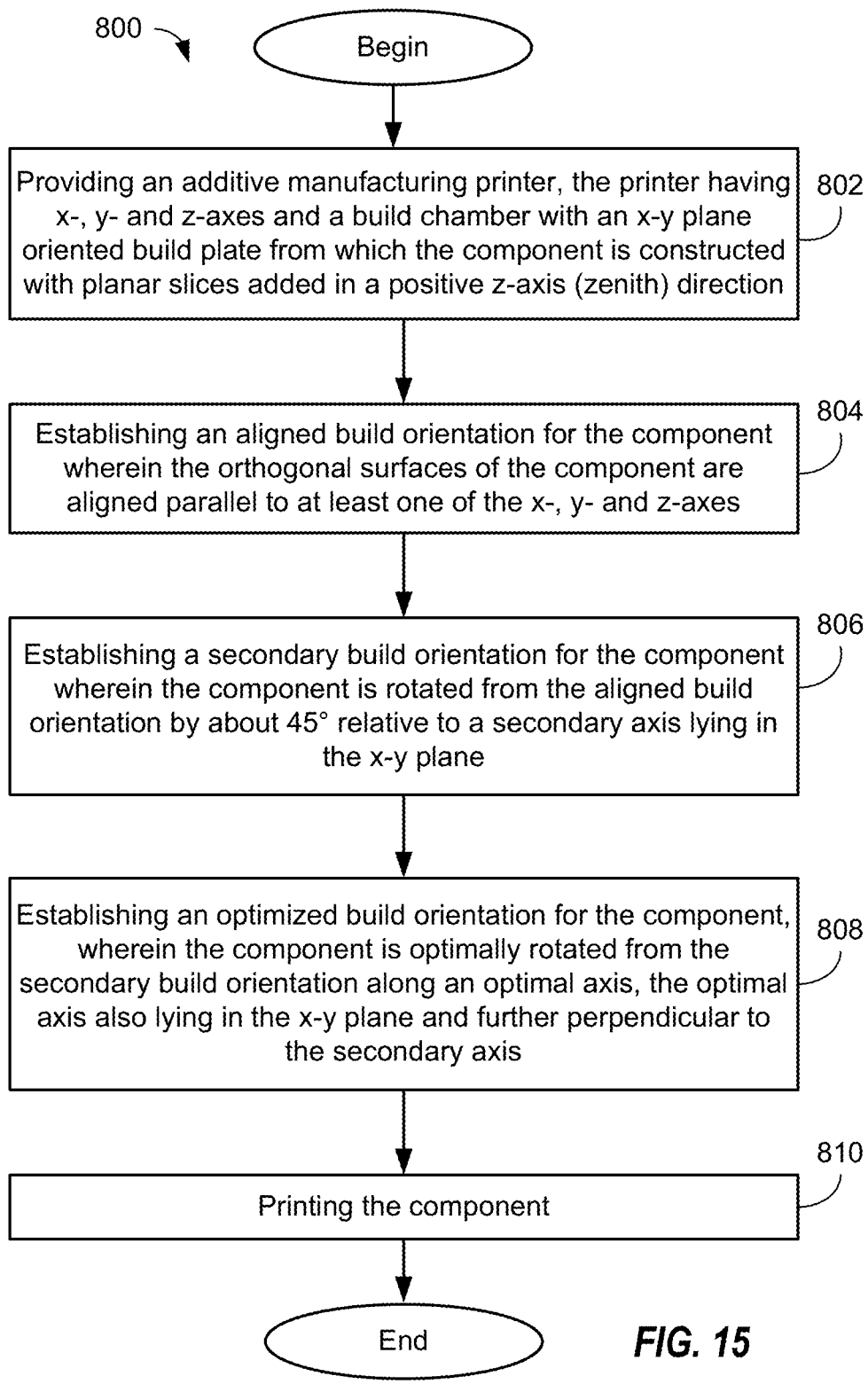
FIG. 15 is a schematic flowchart diagram of a method of metal additive manufacturing of a component where the component has orthogonal surfaces, in accordance with the present disclosure.

FIG. 15 is a flowchart of an embodiment of a method 800 of metal additive manufacturing of a component where the component has orthogonal surfaces, according to the present disclosure. Method 800 may include providing an additive manufacturing printer. The printer may be any suitable additive printer, whether printing in plastic or metal. The printer may also have build axes, namely, x-, y- and z-axes, a build chamber with an x-y plane oriented build plate from which the component may be constructed by adding planar slices in a positive z-axis (zenith) direction.

Method 800 may further include establishing an aligned build orientation for the component. The aligned build orientation includes orthogonal surfaces of the component being aligned parallel to at least one of the x-, y- and z-axes, of the printer. Method 800 may further include establishing a secondary build orientation for the component. In a secondary build orientation, the component is rotated from the aligned build orientation by about 45° relative to a secondary axis lying in the x-y plane. The secondary axis may be the x-axis or the y-axis, according to embodiments. Method 800 may further include establishing an optimized build orientation for the component. In the optimized build orientation, the component is optimally rotated from the secondary build orientation along an optimal axis, the optimal axis also lying in the x-y plane and further perpendicular to the secondary axis. So for example, if the secondary axis is selected to be the x-axis, then the optimal axis may be selected as the y-axis and vice versa, according to embodiments of the present disclosure. Finally, method 800 may further include printing the component in the optimized build orientation.

According to another embodiment of method 800, the step of establishing of an optimized build orientation for the component may include optimally rotating the component in a range from 1° to 35° around the optimal axis. According to another embodiment of method 800, the step of establishing of an optimized build orientation for the component may include optimally rotating the component about 35° around the optimal axis. It will be understood that it is preferable to establish an optimized build orientation prior to printing the component.

According to yet another embodiment of method 800, providing an additive manufacturing printer may also include providing a metal additive manufacturing printer. According to still another embodiment of method 800, the component may be an antenna waveguide. According to additional embodiments, the waveguide may include orthogonal internal surfaces as well as orthogonal external surfaces. According to a particular embodiment of method 800, an overhang angle may be defined between a perpendicular line extending from any surface of the antenna waveguide and the negative z-axis (nadir) direction of the build chamber. According to this particular embodiment, the overhang angle, α, falls in the range, $35° \leq \alpha \leq 55°$, in order to avoid the need for added support structure.

Figure 16:
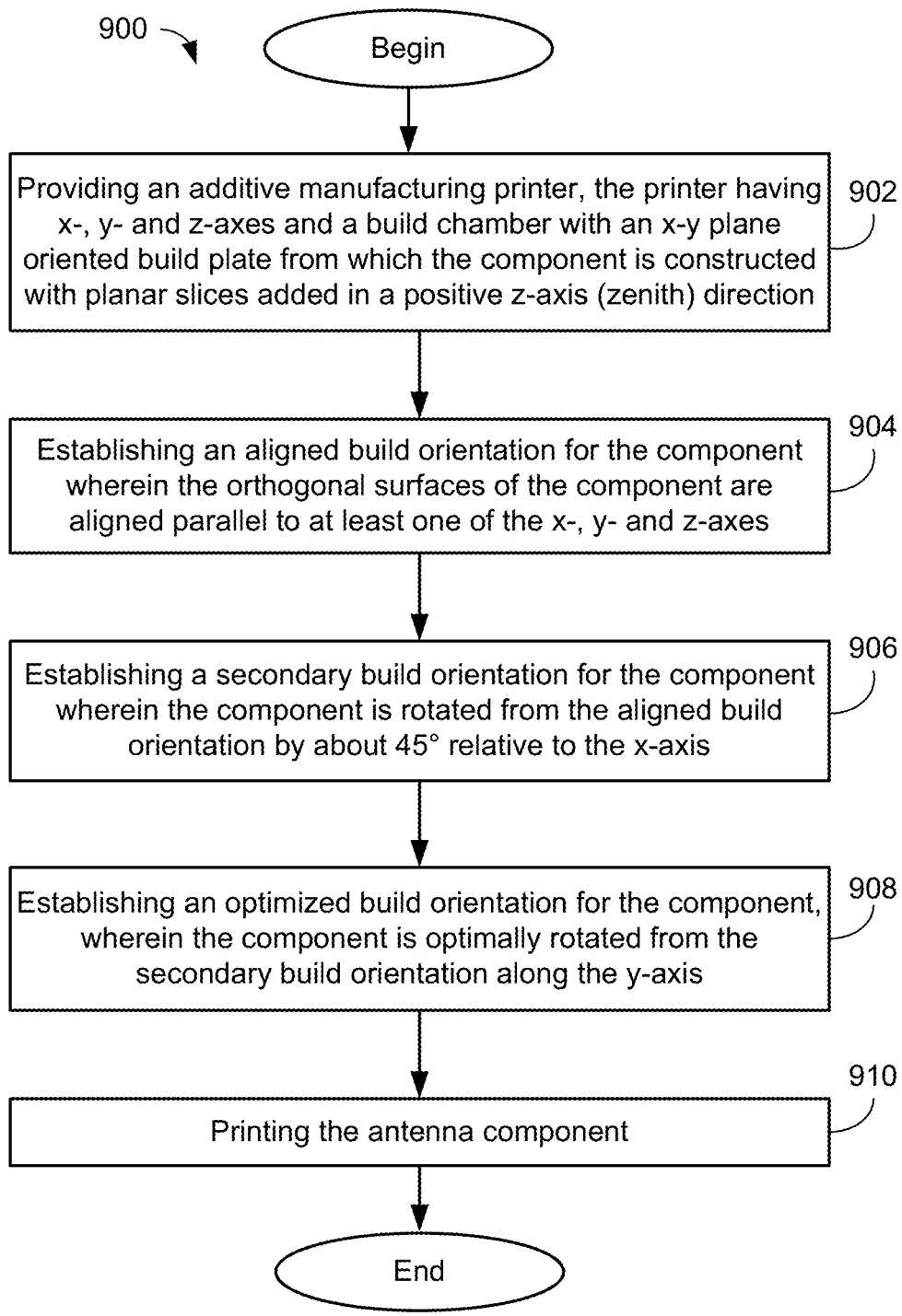
FIG. 16 is a schematic flowchart diagram of metal additive manufacturing an antenna component where the antenna component includes internal orthogonal waveguide surfaces, in accordance with the present disclosure.

FIG. 16 is a flowchart of an embodiment of a method 900 of metal additive manufacturing an antenna component where the antenna component includes internal orthogonal waveguide surfaces, according to the present disclosure. Method 900 may include providing an additive manufacturing printer. According to this embodiment, the printer may have x-, y- and z-axes and a build chamber with an x-y plane oriented build plate from which the component is constructed with planar slices added in a positive z-axis (zenith) direction. Method 900 may further include establishing an aligned build orientation for the component. According to this embodiment, the aligned build orientation is achieved where the orthogonal surfaces of the component are aligned parallel to at least one of the x-, y- and z-axes. Method 900 may further include establishing a secondary build orientation for the component. According to this embodiment, the secondary build orientation may be achieved where the component is rotated from the aligned build orientation by about 45° relative to the x-axis. Method 900 may further include establishing an optimized build orientation for the component. in the optimized build orientation, the component is optimally rotated from the secondary build orientation along the y-axis. Finally, method 900 may further include printing the antenna component.

According to another embodiment of method 900, optimally rotating from the secondary build orientation along the y-axis may include rotating the component in a range from 1° to 35° around the y-axis. According to yet another embodiment of method 900, optimally rotating from the secondary build orientation along the y-axis may include rotating the component about 35° around the y-axis. It will be understood that optimally rotating the component should be completed prior to printing the antenna component, according to the present disclosure.

According to still another embodiment of method 900, the step of providing an additive manufacturing printer may include providing a metal additive manufacturing printer. According to a particular embodiment of method 900, an overhang angle may be defined between a perpendicular line extending from any one of the orthogonal internal waveguide surfaces and the negative z-axis (nadir) direction. According to this particular embodiment, the overhang angle may be 55°.

It will be understood that embodiments of methods 700, 800 and 900 provide build orientations that allow the additive manufacturing fabrication of component parts having all, or substantially all surfaces (internal and external) that are orthogonal to one another. However, it will also be understood that surfaces that are not strictly orthogonal, such as 45° turn surfaces (see, e.g., FIG. 12), and even curved surfaces will also print without the need for structural support as long as the overhang angle remains 55°. The component to be printed according to the methods 700, 800 and 900 of the present disclosure need merely have some orthogonal surfaces used to establish the aligned, secondary and optimized build orientations within the build chamber of an additive manufacturing printer. Other component surfaces need not be orthogonal, or linear, as long as the overhang angle 55°, if support structure is to be avoided.

While the foregoing advantages of the present disclosure are manifested in the illustrated embodiments of the disclosure, a variety of changes can be made to the configuration, design and construction of the embodiments described herein to achieve those advantages. Hence, reference herein to specific details of the structure and function of the present disclosure is by way of example only and not by way of limitation.

What is claimed is:

1. A method of additive manufacturing a component that comprises at least one pair of substantially orthogonal surfaces located internally to the component, wherein the method comprises:
   providing an additive manufacturing printer comprising:
     a coordinate system comprising x-, y-, and z-axes; and
     a build chamber comprising a build plate oriented in an x-y plane;
     wherein the additive manufacturing printer constructs the component with planar slices added in a positive z-axis (zenith) direction relative to the build plate;
   providing a metal feedstock to the additive manufacturing printer;
   rendering a representation of the component;
   establishing an aligned build orientation for the component relative to the coordinate system by rendering the representation of the component such that at least one surface of the representation of the component is substantially parallel to one of the x-, y-, or z-axes of the coordinate system for the additive manufacturing printer;

establishing a secondary build orientation for the component by rotating the representation of the component from the aligned build orientation by about 45° relative to a secondary axis lying in the x-y plane;

establishing an optimized build orientation for the component by rotating the representation of the component from the secondary build orientation along an optimal axis also lying in the x-y plane such that an overhang angle of the component is less than or equal to fifty-five degrees, wherein the optimal axis is perpendicular to the secondary axis, and wherein the overhang angle is defined between the z-axis of the coordinate system and a perpendicular line extending from any surface of the component; and electronically communicating the optimized build orientation to the additive manufacturing printer and causing the additive manufacturing printer to transform the metal feedstock into a physically printed metal component by adding planar slices of the metal feedstock in the positive z-axis direction relative to the build plate and according to the optimized build orientation of the component;

wherein the physically printed metal component comprises the at least one pair of substantially orthogonal surfaces located internally to the physically printed metal component; and wherein the additive manufacturing printer prints the at least one pair of substantially orthogonal surfaces located internally to the physically printed metal component without aid of an internal support structure due to the additive manufacturing printer printing according to the optimized build orientation.

2. The method of claim 1, wherein establishing the optimized build orientation for the component comprises optimally rotating the representation of the component in a range from 1° to 35° around the optimal axis.

3. The method of claim 1, wherein establishing the optimized build orientation for the component comprises optimally rotating the representation of the component about 35° around the optimal axis.

4. The method of claim 1, wherein the additive manufacturing printer is a metal additive manufacturing printer; and
wherein the component comprises an antenna waveguide.

5. The method of claim 1, wherein the at least one pair of substantially orthogonal surfaces are substantially orthogonal to each other, and wherein the at least one pair of substantially orthogonal surfaces are located internally to the physically printed metal component such that the substantially orthogonal surfaces cannot be reached from an outside of the physically printed metal component.

6. The method of claim 1, wherein establishing the aligned build orientation for the representation of the component comprises ensuring that each surface of the at least one pair of substantially orthogonal surfaces located internally to the component is substantially parallel to one of the x-, y-, or z-axes of the coordinate system for the additive manufacturing printer.

7. The method of claim 1, wherein establishing the secondary build orientation for the component comprises rotating the representation of the component from the aligned build orientation by about 45° about the y-axis of the coordinate system; and wherein establishing the optimized build orientation for the component comprises rotating the representation of the component from the secondary build orientation about the x- axis of the coordinate system.

8. The method of claim 1, wherein establishing the secondary build orientation for the component comprises rotating the representation of the component from the aligned build orientation by about 45° about the x-axis of the coordinate system; and wherein establishing the optimized build orientation for the component comprises rotating the representation of the component from the secondary build orientation about the y-axis of the coordinate system.

9. The method of claim 1, wherein the component comprises a hollow waveguide configured to propagate a wave of electromagnetic energy.

10. The method of claim 1, wherein the component comprises a plurality of orthogonal surfaces, and wherein the optimized build orientation is optimized to eliminate the use of any internal support structures when printing the component using metal additive manufacturing processes.

11. Thet method of claim 1, further comprising rendering a representation of the build chamber of the additive manufacturing printer, and wherein rendering the representation of the component comprises rendering within the representation of the build chamber of the additive manufacturing printer.

12. The method of claim 11, wherein establishing the aligned build orientation for the component relative to the coordinate system comprises ensuring that at least a portion of the at least one pair of substantially orthogonal surfaces comprises one surface that is substantially parallel to one of the x-, y-, or z-axes of the coordinate system for the additive manufacturing printer.

13. The method of claim 1, wherein the physically printed metal component comprises the at least one pair of substantially orthogonal surfaces located internally to the physically printed metal component, and further comprises at least one pair of substantially orthogonal surfaces located externally to the physically printed component.

14. A method of additive manufacturing an antenna component that comprises at least one pair of substantially orthogonal surfaces located internally to the antenna component, wherein the method comprises:

providing a metal additive manufacturing printer comprising:
a coordinate system comprising x-, y-, and z-axes; and
a build chamber comprising a build plate oriented in the x-y plane;
wherein the metal additive manufacturing printer constructs the antenna component with planar slices added in a positive z-axis (zenith) direction relative to the build plate;

providing a metal feedstock to the additive manufacturing printer;

rendering a representation of the antenna component;

establishing an aligned build orientation for the antenna component relative to the coordinate system such that at least one surface of the representation of the antenna component is substantially parallel to one of the x-, y-, or z-axes of the metal additive manufacturing printer;

establishing a secondary build orientation for the antenna component by rotating the representation of the antenna component from the aligned build orientation by about 45° relative to the x-axis;

establishing an optimized build orientation for the antenna component by rotating the representation of the antenna component from the secondary build orientation along an optimal axis also lying in the x-y plane such that an overhang angle of the antenna component is less than or equal to fifty-five degrees, wherein the optimal axis is perpendicular to the secondary axis, and wherein the overhang angle is defined between the z-axis of the coordinate system and a perpendicular line extending from any surface of the antenna component; and electronically communicating the optimized build orientation to the additive manufacturing printer and causing the metal additive manufacturing printer to transform the metal feedstock into a physical printed metal antenna component by adding planar slices of the metal feedstock in the positive z-axis direction relative to the build plate and according to the optimized build orientation of the antenna component;

wherein the physically printed metal antenna component comprises the at least one pair of substantially orthogonal surfaces located internally to the physically printed metal antenna component; and wherein the metal additive manufacturing printer prints the at least one pair of substantially orthogonal surfaces located internally to the physically printed metal antenna component without aid of an internal support structure due to the metal additive manufacturing printer printing according to the optimized build orientation.

15. The method of claim 14, wherein establishing the optimized build orientation for the component by rotating the representation of the component from the secondary build orientation along the optimal axis comprises rotating the representation of the antenna component in a range from 1° to 35° around the y-axis.

16. The method of claim 14, wherein establishing the optimized build orientation for the component by rotating the representation of the component from the secondary build orientation along the optimal axis comprises rotating the representation of the antenna component about 35° around the y-axis.

17. A method of metal additive manufacturing for a waveguide, wherein the waveguide comprises at least one pair of substantially orthogonal surfaces located internally to the waveguide, and wherein the method comprises:

providing an additive manufacturing printer comprising:
a coordinate system comprising x-, y-, and z-axes; and
a build chamber comprising a build plate oriented in an x-y plane;
wherein the additive manufacturing printer constructs the component with planar slices added in a positive z-axis (zenith) direction relative to the build plate;

providing a metal feedstock to the additive manufacturing printer;

rendering a representation of the waveguide;

establishing an aligned build orientation for the waveguide relative to a coordinate system of a metal additive manufacturing printer such that at least one surface of the waveguide is substantially parallel to one of the x-, y-, or z-axes of the coordinate system of the metal additive manufacturing printer;

establishing a secondary build orientation for the waveguide by rotating the representation of the waveguide from the aligned build orientation by 45° relative to a secondary axis lying in the x-y plane;

establishing an optimized build orientation for the waveguide by rotating the representation of the waveguide from the secondary build orientation along an optimal axis also lying in the x-y plane such that an overhang angle of the waveguide is less than or equal to fifty-five degrees, wherein the optimal axis is perpendicular to the secondary axis, and wherein the overhang angle is defined between the z-axis of the coordinate system and a perpendicular line extending from any surface of the waveguide; and electronically communicating the optimized build orientation to the additive manufacturing printer and causing the additive manufacturing printer to transform the metal feedstock into a physically printed metal waveguide by adding planar slices of the metal feedstock in the positive z-axis direction relative to the build plate and according to the optimized build orientation of the waveguide;

wherein the physically printed metal waveguide comprises at least one pair of substantially orthogonal surfaces located internally to the physically printed metal waveguide; and wherein the metal additive manufacturing printer prints the at least one pair of substantially orthogonal surfaces located internally to the physically printed metal waveguide without aid of an internal support structure due to the metal additive manufacturing printer printing according to the optimized build orientation for the waveguide.

18. The method of claim 17, wherein establishing the optimized build orientation for the waveguide comprises optimally rotating the representation of the waveguide in a range from 1° to 35° around the optimal axis.

19. The method of claim 17, wherein establishing the optimized build orientation for the waveguide comprises optimally rotating the representation of the waveguide 35° around the optimal axis.

* * * * *